United States Patent Office 3,620,036
Patented Nov. 16, 1971

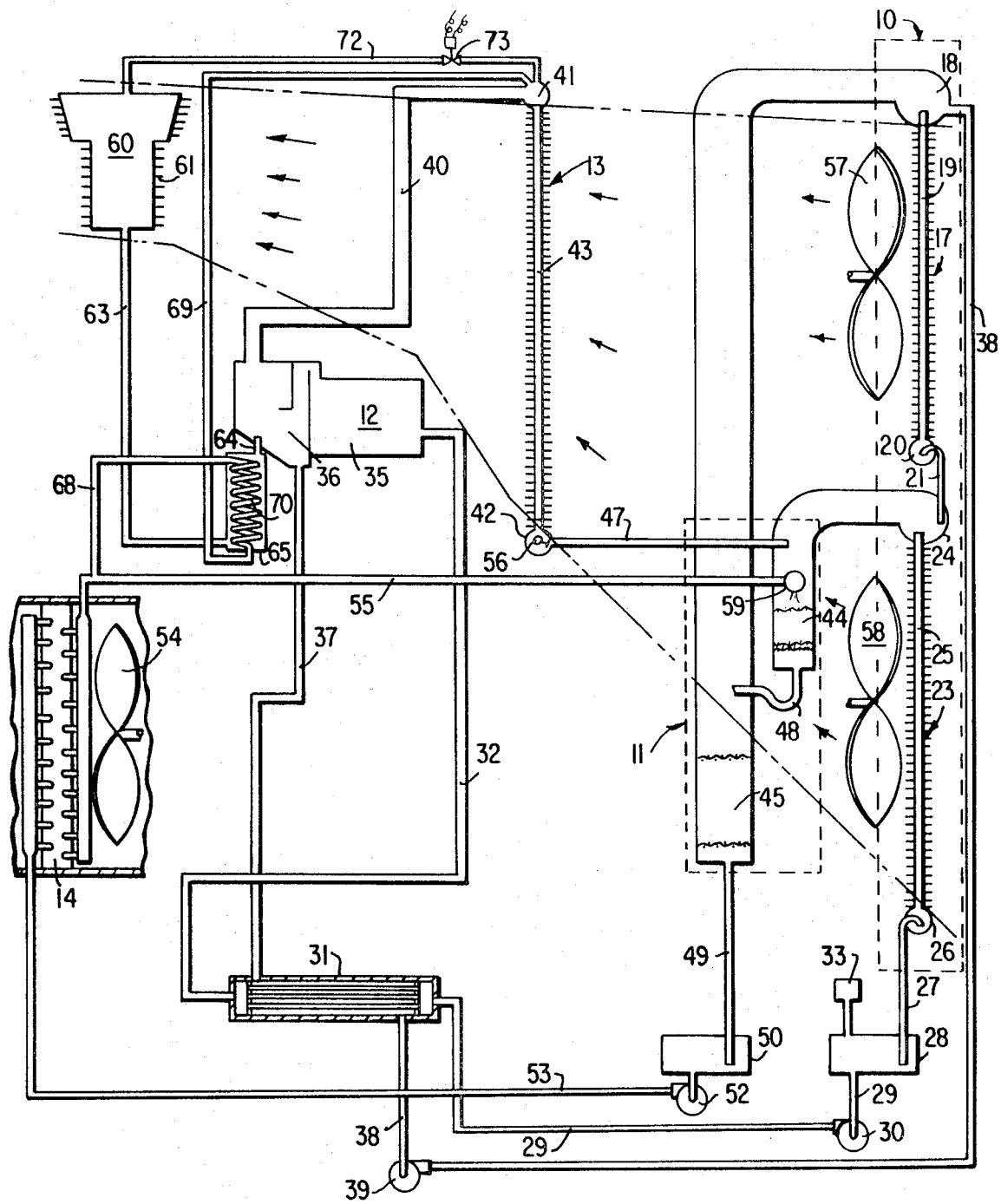

3,620,036
SOLUTION CONCENTRATION CONTROL IN
ABSORPTION REFRIGERATION SYSTEMS
Louis H. Leonard, Jr., Dewitt, and William W. Bell, Jr., Marcellus, N.Y., assignors to Carrier Corporation, Syracuse, N.Y.
Filed Aug. 29, 1969, Ser. No. 854,206
Int. Cl. F25b 15/06
U.S. Cl. 62—101                                                  16 Claims

ABSTRACT OF THE DISCLOSURE

An absorption refrigeration system having a concentration control tank connected to receive refrigerant from a concentration control condenser which condenses vapor formed in the generator. A cooling medium is passed first over the absorber, then over the condenser, and finally over the concentration control tank to provide a control pressure therein. A concentration control passage, including a depending loop, extends between a region of the system which is at refrigerant condenser pressure into the concentration control tank. The difference in pressure between the concentration control tank and the refrigerant condenser is balanced by a column of liquid extending into the concentration control tank. When the cooling medium temperature drops, the difference in pressure between the concentration control tank and the refrigerant condenser is reduced, which causes refrigerant to be discharged from the concentration control tank into the strong absorbent solution. Conversely, when the cooling medium temperature rises, the difference in pressure between the concentration control tank and the refrigerant condenser increases causing the refrigerant, which is condensed in the concentration control condenser, to be stored in the concentration control tank. A vent passage is provided with a valve therein for rapidly discharging the contents of the concentration control tank into the strong solution circuit to protect against solidification in the event of an electrical power failure.

BACKGROUND OF THE INVENTION

This invention relates to a method and means for automatically adjusting the concentration of absorbent solution in an absorption refrigeration system to prevent solidification thereof.

Absorption refrigeration systems utilizing an aqueous solution of lithium bromide as an absorbent solution and water as a refrigerant have received wide commercial acceptance. Such systems, however, are subject to solidification of the absorbent solution when operated at excessively high absorbent concentrations or excessively low ambient temperatures. It is desirable for the absorbent solution concentration to be relatively high during periods of high ambient absorber and condenser temperatures in order to obtain maximum refrigeration capacity and high efficiency from the system. On the other hand, if the ambient temperature drops during operation, solidification can occur unless the maximum solution concentration is limited below that required for full refrigeration capacity at higher ambient temperatures.

In addition, normal shutdown of the machine can result in solidification if appropriate steps are not taken to dilute the solution. However, a sudden power failure can render many prior dilution systems inoperative or ineffective at a time when they are critically needed on an unexpected shutdown of the system. Also, a sudden drop in ambient temperature, such as occasioned by a rain storm, may cause an air-cooled machine to solidify before the dilution control is effective to satisfactorily dilute the system.

Another condition, which can give rise to solidification, occurs when the absorber, for some reason, is incompletely purged, such as may occur after a prolonged period of shutdown. Under these conditions, the absorption capacity of the absorber is reduced and the machine tends to overconcentrate the solution to compensate for the lack of absorber capacity. When this happens, solidification may occur before the machine has reached its normal operating capacity.

Accordingly, it is a principal feature of this invention to provide a concentration control for an absorption refrigeration system which automatically adds or removes refrigerant from the absorbent solution in accordance with an ambient cooling medium temperature.

BRIEF DESCRIPTION OF THE DRAWING

The drawing schematically illustrates an air-cooled absorption refrigeration system having concentration control means in accordance with this invention.

DESCRIPTION OF A PREFERRED EMBODIMENT

This invention will be described with reference to an absorption refrigeration system wherein an aqueous solution of lithium bromide is an absorbent and water is a refrigerant. Other absorbent and refrigerant combinations may also be employed, especially hygroscopic aqueous halide salts. As used herein, strong solution refers to a concentrated absorbent solution which is strong in absorbing power, and weak solution refers to a dilute absorbent solution which is weak in absorbing power.

The drawing illustrates an air-cooled absorption refrigeration system having an absorber 10, an evaporator 11, a generator 12, and a condenser 13. Water is cooled in evaporator 11 and is pumped through an air conditioning heat exchanger 14 to cool air being conditioned.

Absorber 10 is preferably a two-stage absorber suitable for use with an air-cooled refrigeration system wherein air is the cooling medium passed over the absorber to reject heat to the air. Low pressure absorber stage 17 comprises a vapor header 18, a plurality of vertical finned heat exchange tubes 19 and a lower liquid header 20. High pressure absorber stage 23 is joined by intermediate solution passage 21 to low pressure absorber stage 17. High pressure absorber stage 23 comprises a vapor header 24, a plurality of finned tubes 25 and a lower liquid header 26.

Weak solution passage 27 extends from liquid header 26 to a weak solution sump 28 where weak absorbent solution is collected. The weak solution is then pumped by weak solution pump 30 through weak solution passage 29, heat exchanger 31, and weak solution passage 32 to generator 12. The weak solution is heated in heating section 35 of generator 12 by directly heating the generator with a fuel burner or by passing a hot fluid in heat exchange relation therethrough. The weak solution is boiled in generator 12 driving off refrigerant vapor and concentrating the solution to form strong solution.

The strong absorbent solution overflows the weir between heating section 35 and passes into separating section 36 of generator 12. Strong solution passes out of separating section 36 through strong solution passage 37 to heat exchanger 31 through which it passes in heat exchange relation with weak solution being forwarded to the generator. The cooled strong solution is pumped by strong solution pump 39 through a strong solution passage 38 into vapor header 18 of absorber 10.

The strong solution overflows the top of absorber tubes 19 and absorbs refrigerant vapor while it is being cooled by ambient air passing over the absorber tubes. The resulting intermediate strength solution is collected in liquid header 20 and passes through intermediate solution passage 21 downwardly through absorber tubes 25 in which it absorbs additional refrigerant vapor. The weakened solution then passes through passage 27 to weak solution sump 28. A suitable purge unit 33 may be connected to remove noncondensible gases from the top of the weak solution sump.

The vapor formed in heating section 35 of generator 12 passes into separator section 36 in which it separates from the strong solution and passes upwardly through refrigerant vapor passage 40 into vapor header 41 of condenser 13. Ambient cooling air is passed over the outside of finned heat exchange tubes 43 of condenser 13 to cool and condense the refrigerant vapor. The liquid refrigerant is collected in liquid header 42 and passes through float valve 56 and refrigerant liquid passage 47 into evaporator 11.

Evaporator 11 is preferably of a two-stage adiabatic type wherein a small amount of refrigerant is evaporated to cool the remaining refrigerant in each of its adiabatic stages. A portion of the condensed refrigerant flashes in high temperature evaporator stage 44 which cools the remaining refrigerant liquid. The resulting water vapor passes into vapor header 24 and is absorbed into absorbent passing through high pressure absorber stage 23. The cooled remaining refrigerant passes through chilled water passage 48 into low temperature evaporator stage 45 where additional refrigerant flashes, resulting in further cooling of the remaining liquid. The water vapor formed in low temperature evaporator stage 45 passes to vapor header 18 and is absorbed into absorbent solution passing through low pressure absorber stage 17. The cold refrigerant drains from low temperature evaporator stage 45 through refrigerant passage 49 into refrigerant sump 50. The cold refrigerant is then pumped by refrigerant pump 52 through chilled water line 53 and heat exchanger 14 where it passes in heat exchange relation with air being circulated by fan 54 to a region being conditioned. The refrigerant is then returned through refrigerant passage 55 back to high temperature evaporator stage 44 of evaporator 11 through restricted spray nozzle 59 for recooling.

In accordance with this invention, there is provided a method and means for automatically adjusting the concentration of absorbent solution circulating in the system. For this purpose, a concentration control tank 60 is provided at an elevation above the bottom of generator 12. Concentration control tank 60 may be provided with fins 61 or other suitable means for placing it in heat exchange relation with ambient air. Preferably, a fan 57 and a fan 58 are disposed to pass air first over absorber tubes 19 and 25 respectively, then over condenser 13, and finally over concentration control tank 60, after which the air is dischargd back to the atmosphere.

Concentration control tank 60 is connected by a concentration control passage with separating section 36 of generator 12. The concentration control passage comprises a depending loop having one leg 63 communicating with the concentration control tank and another leg 64 communicating with the vapor space in separating section 36. A concentration control condenser 65 is disposed in leg 64. A small amount of cool water is bled from refrigerant passage 55 through cooling water passage 68 and passes through heat exchanger coil 70 within the concentration control condenser to cool and condense refrigerant vapor therein. The cooling water passes from the concentration control condenser through cooling water passage 69 into vapor header 41 of condenser 13. A vent passage 72 having vent valve 73 therein connects the upper portion of concentration control tank 60 with vapor header 41 of refrigerant condenser 13.

Assuming that the refrigeration system is operating at maximum capacity for the particular design ambient cooling medium condition selected, concentration control tank 60 is preferably positioned and sized so that it is substantially full of liquid refrigerant. It has been discovered that an unexpectedly useful relationship exists between the changes in temperature of the ambient cooling air or other cooling medium leaving absorber 10 and condenser 13, and the resulting changes in pressure produced by passing this air in heat exchange relation with the concentration control tank. The cooling medium leaving the condenser is somewhat cooler by an approximately constant temperature than the condensing temperature in the system and is capable of maintaining the concentration control tank at the colder temperature. Under these conditions, a lower pressure exists due to cooling of the refrigerant stored in tank 60 than the condensing pressure existing in condenser 13. This difference in pressure is balanced by the head of liquid present in leg 63 and tank 60.

As previously explained, when the system is operating at full capacity and design ambient temperature conditions, there is a danger of solidification of the strong absorbent solution in heat exchanger 31, pump 39 and even within absorber tubes of the absorber 10, should there be a drop in ambient air temperature. However, if there is a drop in ambient temperature, the temperature of the air leaving condenser 13 will also drop, and consequently tank 60 will be cooled to a lower temperature and pressure by the air leaving the condenser. Even though the difference in temperature between condenser 13 and tank 60 remains about the same as the ambient temperature drops, the corresponding pressure difference between condenser 13 and tank 60 decreases due to the lower temperature involved. Consequently, the pressure difference between the condenser and the concentration control tank will no longer support as large a column of liquid and the level in tank 60 drops to rebalance the loop in the concentration control passage. As the level in tank 60 drops, the refrigerant is discharged from tank 60 through the other leg 64 into separator 36 and is spilled directly into strong solution passage 37. Consequently, the strong solution is immediately diluted sufficiently to prevent solidification in the heat exchanger and in strong solution pump 39. The absorber sections are also diluted when the refrigerant reaches them via strong solution pump 39. Dilution of the strong absorbent solution with refrigerant also releases the heat of dilution to warm the solution which helps prevent solidification thereof.

In the event the ambient air temperature begins to rise again, the pressure difference between the tank 60 and condenser 13 will increase and the refrigerant level in tank 60 begins to rise. The increased level in tank 60 in turn causes refrigerant liquid to drain from concentration control condenser 65 and vapor to enter the condenser. The refrigerant vapor entering the concentration control condenser 65 continues to condense until a new equilibrium level is established between tank 60 and condenser 13. When this happens, the concentration control condenser fills up with liquid whereupon it ceases to receive and condense vapor until conditions change requiring a further increase in the level of tank 60.

The upper portion of tank 60 is preferably of non-uniform cross-sectional area so as to provide a predetermined quantity of refrigerant liquid to the strong solution circulating in the system for various operating temperature conditions. The lower portion of tank 60 may be designed to maintain a quantity of excess refrigerant. In the event of a power failure, pump 39 would stop and normally open vent valve 73 opens to vent tank 60 to header 41. When this happens, the elevation of tank 60 is such that its entire contents are rapidly spilled into separator 36 to instantly dilute strong solution in passage 37, heat exchanger 31 and pump 39 to prevent solidification therein. Tank 60 may alternately be vented to the low pressure side of the system, such as evaporator 11, if desired.

It is preferred to pass ambient air first over the absorber and then over the concentration control tank, because this arrangement provides an unexpected advantage. In the event that absorber 10 is poorly purged, the solution may be over-concentrated by the generator in an attempt to provide the desired refrigeration capacity. Solidification could occur in prior systems. In the preferred arrangement, the temperature of the air passing over tank 60 will be reduced if the absorber is poorly purged because of the reduced heat of dilution and latent heat of condensation rejected therefrom. This causes the temperature of the concentration control tank to drop which causes the pressure difference to drop. When this happens, refrigerant passes from the concentration control tank into the strong solution circuit just as if the ambient air temperature had dropped, and dilutes the strong solution to prevent solidification thereof. While the series arrangement described is preferred, concentration control tank 60 may be placed in heat exchange relation with only the absorber cooling medium or only the condenser cooling medium, or both, and either before or after the cooling medium has passed in heat exchange relation with the heat exchanger being cooled by it, to achieve many of the dilution control advantages of this invention.

It is preferred to use a multiple-stage, air-cooled absorber as illustrated in the drawing, but it will be understood that a single or multi-stage air or liquid cooled absorber may be employed. In the event that a liquid cooled absorption machine is desired, it is preferred to run the cooling water in series through the absorber, the condenser, and the heat exchanger, in the concentration control tank, in that order, although other arrangements where the air or the cooling liquid is passed in parallel or other combinations may be utilized to achieve many advantages of this invention. The preferred adiabatic evaporators may be replaced with single or multiple-stage conventional refrigerant evaporators having heat exchange tubes therein for chilling a desired fluid. In addition, concentration control condenser 65 may be cooled with other cooling media, if desired, such as weak absorbent solution.

While the arrangement shown utilizes a concentration control passage having a depending loop connected to separator 36, it is feasible to connect leg 64 of the concentration control passage at other locations in the system which are in communication with a region containing solution which it is desired to dilute. For example, leg 64 may be directly in communication with pump 39 or with a generator overflow passage leading to the absorber in the event one is used and it is desired to directly dilute the absorber. In addition, concentration control tank 60 may be fed with liquid refrigerant from liquid header 42 of condenser 14, if it is desired to omit the concentration control condenser, or the concentration control condenser may be connected directly between a refrigerant vapor containing region and tank 60 without being part of the refrigerant loop depending therefrom.

A major advantage of the invention described is that the dilution tank provides a variable quantity of refrigerant to dilute the strong absorbent solution depending on the conditions of the operation of the system. With a large drop in ambient temperature, a large quantity of refrigerant is supplied to the system, but in the event of a small drop in temperature, only a small quantity of dilution is required and provided. Similarly, the dilution system reacts at the same rate as the ambient absorber and condenser temperature changes. Thus, when a sharp drop in the ambient temperature is experienced, such as in a sudden rain storm, the dilution is almost immediate, whereas the dilution will slowly increase with a slow change in ambient. Consequently, the system is not overdiluted nor diluted unless solidification is imminent during operation, which would result in loss of refrigeration capacity and efficiency.

In addition, the dilution tank may be so sized as to provide a uniform shutdown concentration which will protect the refrigeration system against solidification at normally encountered ambient temperatures. Thus, the tank may limit the amount of dilution provided on shutdown of the system to only that quantity necessary to bring the solution concentration down to the desired value. Prior systems which supplied a constant volume of solution on shutdown, had to be designed so as to overdilute the system if shutdown occurred at a time when the solution was already dilute. Under such conditions, with the invention described, the tank contains only a small amount of refrigerant and little additional dilution is provided on shutdown.

Accordingly, this invention may be otherwise embodied within the scope of the following claims.

We claim:

1. An absorption refrigeration system comprising:
   (A) an absorber for passing absorbent solution in heat exchange relation with a cooling medium and for absorbing refrigerant vapor into the cooled absorbent solution;
   (B) a generator for concentrating absorbent solution by vaporizing refrigerant from the solution;
   (C) a refrigerant condenser for passing refrigerant vapor formed in said generator in heat exchange relation with a cooling medium to condense the refrigerant vapor; and
   (D) an evaporator for evaporating liquid refrigerant condensed in said condenser and providing refrigeration;
   wherein the improvement comprises:
   (E) refrigerant storage means comprising a concentration control tank for storing a quantity of refrigerant out of circulation in said system;
   (F) heat exchange means for passing a fluid into heat exchange relation with refrigerant in said concentration control tank to provide a control pressure functionally related to the temperature of at least one of said cooling media; and
   (G) concentration control passage means for accumulating refrigerant in said concentration control tank and for automatically discharging refrigerant therefrom into absorbent solution in accordance with the difference in pressure existing between the condenser pressure and said control pressure whereby the concentration of the absorbent solution may be reduced upon a drop in cooling medium temperature.

2. An absorption refrigeration system as defined in claim 1 including means for directly passing said one cooling medium in heat exchange relation with refrigerant in said concentration control tank to provide said control pressure.

3. An absorption refrigeration system as defined in claim 1 wherein said concentration control passage means comprises a depending refrigerant loop having one leg connected with said concentration control tank and having another leg connected with a region in communication with condenser pressure and with a location containing strong absorbent solution, said concentration control passage means being connected to provide a column of liquid refrigerant in the concentration control tank and said one leg of said refrigerant passage to balance the difference in pressure between the pressure in said refrigerant condenser and the pressure in said concentration control tank, whereby the quantity of refrigerant stored in said concentration control tank is varied as a function of the temperature of said one cooling medium.

4. An absorption refrigeration system as defined in claim 1 wherein the cooling media passing in heat exchange relation with absorbent solution in said absorber and refrigerant vapor in said refrigerant condenser comprise ambient air.

5. An absorption refrigeration system as defined in claim 1 wherein the cooling media comprise ambient air, and said system includes means for passing the air over said absorber in heat exchange relation with absorbent solution therein, and then over said concentration control tank in heat exchange relation with refrigerant liquid therein to provide said control pressure so that the temperature and pressure in said concentration control tank is a function of both the absorber heat rejection and ambient air temperature during operation of said system.

6. An absorption refrigeration system as defined in claim 1 wherein said concentration control tank is at a higher elevation than the bottom of said generator, said concentration control passage being in communication with a region in said system containing absorbent solution at a lower level than said tank so that refrigerant drains from said concentration control tank and mixes directly with absorbent solution to inhibit solidification thereof, said system including vent passage means connecting said concentration control tank with a region which is at substantially condenser pressure to thereby dilute solution in the system upon occurrence of an electrical power failure while said system is in operation.

7. An absorption refrigeration system as defined in claim 1 including means for supplying liquid refrigerant to said concentration control tank comprising a concentration control condenser, said concentration control condenser being in communication with a region containing refrigerant vapor formed in the generator whereby refrigerant vapor passes into said concentration control condenser, and means for cooling refrigerant vapor in said concentration control condenser to condense refrigerant therein for passage to said concentration control tank through said concentration control passage means.

8. An absorption refrigeration system as defined in claim 1 including means for supplying liquid refrigerant to said concentration control tank comprising a concentration control condenser, said concentration control passage means including a depending refrigerant loop having one leg in communication with the concentration control tank and having another leg comprising said concentration control condenser in communication with a region containing refrigerant vapor formed in the generator, whereby the refrigerant vapor passes through said other leg into said concentration control condenser; and passage means for passing fluid chilled by the refrigeration system in heat exchange relation with refrigerant vapor in said concentration control condenser to condense refrigerant therein for passage to said concentration control tank through said one leg of the concentration control passage.

9. A method of operating an absorption refrigeration system having a generator, a condenser, an evaporator, and absorber, and a concentration control tank, which comprises the steps of:
(A) concentrating solution by heating it in the generator to vaporize refrigerant therefrom;
(B) condensing refrigerant vaporized in the generator by passing it in heat exchange relation with a cooling medium in the condenser;
(C) evaporating condensed refrigerant in the evaporator to produce cooling;
(D) passing absorbent solution in heat exchange relation with a cooling medium and absorbing refrigerant vapor formed in the evaporator into cooled absorbent solution in the absorber;
wherein the improvement comprises:
(E) passing a fluid in heat exchange relation with refrigerant in said concentration control tank to establish a control pressure related to the temperature of at least one of the cooling media; and
(F) controlling the concentration of absorbent solution in the system by accumulating refrigerant in the concentration control tank and discharging refrigerant from said concentration control tank into absorbent solution in the system in an amount which is a function of the difference in pressure between the condensing pressure and said control pressure.

10. A method of operating an absorption refrigeration system as defined in claim 9 wherein the step of passing said fluid in heat exchange relation with refrigerant to establish said one control pressure comprises passing the coolant medium directly in heat exchange relation with the refrigerant in the concentration control tank.

11. A method of operating an absorption refrigeration system as defined in claim 9 wherein the step of condensing refrigerant in the condenser comprises passing air over the condenser in heat exchange relation with refrigerant therein, and wherein the step of passing fluid in heat exchange relation with refrigerant to establish the control pressure comprises passing air from the condenser over the concentration control tank so that the temperature and pressure of refrigerant in the tank is a function of the temperature of air leaving the condenser.

12. A method of operating an absorption refrigeration system as defined in claim 9 wherein the step of passing absorbent solution in heat exchange relation with a cooling medium comprises passing air over the absorber in heat exchange relation with absorbent solution therein, and wherein the step of passing fluid in heat exchange relation with refrigerant to establish a control pressure comprises passing air from the absorber over the concentration control tank so that the temperature and pressure of refrigerant in the tank is a function of the temperature of the air leaving the absorber.

13. A method of operating an absorption refrigeration system as defined in claim 9 including the steps of passing air over the absorber as the cooling medium to cool absorbent solution therein; passing the air from the absorber over the refrigerant condenser as the cooling medium to condense refrigerant vapor therein; and passing the air from the refrigerant condenser over the concentration control tank to regulate the temperature thereof and to provide the control pressure for regulating the quantity of liquid stored in the concentration control tank.

14. A method of operating an absorption refrigeration system as defined in claim 9 wherein the step of passing fluid in heat exchange relation with refrigerant to establish the control pressure comprises passing the cooling medium directly in heat exchange relation with the fluid in the concentration control tank, and wherein the step of controlling the concentration of absorbent solution in the system comprises balancing the pressure difference between the refrigerant condenser and the concentration control tank with a column of refrigerant including the concentration control tank and discharging refrigerant into absorbent solution in the system to rebalance the column upon a drop in cooling medium temperature.

15. A method of operating an absorption refrigeration system as defined in claim 9 including the steps of supplying refrigerant to the concentration control tank by condensing refrigerant vapor generated in the generator in a concentration control condenser by passing a fluid cooled in said system in heat exchange relation with refrigerant vapor in the concentration control condenser and passing the resulting condensate to the concentration control tank.

16. A method of operating an absorption refrigeration system as defined in claim 9 which includes the step of venting the concentration control tank thereby discharging liquid refrigerant from the concentration control tank into absorbent solution to dilute the absorbent solution upon the occurrence of a failure of the electric power supplied to said system.

References Cited

UNITED STATES PATENTS

| | | | |
|---|---|---|---|
| 2,465,904 | 3/1949 | McNeely | 62—103 |
| 2,679,733 | 6/1954 | Ashley | 62—103 X |
| 2,738,653 | 3/1956 | Berry | 62—149 |
| 3,517,522 | 6/1970 | Ozono et al. | 62—141 |

WILLIAM F. O'DEA, Primary Examiner

P. D. FERGUSON, Assistant Examiner

U.S. Cl. X.R.

62—141, 476